Aug. 2, 1966

J. H. FLAHERTY 3,263,268

HINGE WITH A THERMOSETTING RESIN PORTION

Filed Nov. 19, 1962

INVENTOR.
James H. Flaherty
BY
His Attorney

Aug. 2, 1966  J. H. FLAHERTY  3,263,268

HINGE WITH A THERMOSETTING RESIN PORTION

Filed Nov. 19, 1962  3 Sheets-Sheet 2

INVENTOR.
James H. Flaherty
BY
*Albert H. Reuther*
His Attorney

Aug. 2, 1966  J. H. FLAHERTY  3,263,268
HINGE WITH A THERMOSETTING RESIN PORTION
Filed Nov. 19, 1962  3 Sheets-Sheet 3

INVENTOR.
James H. Flaherty
BY
His Attorney

United States Patent Office 3,263,268
Patented August 2, 1966

3,263,268
HINGE WITH A THERMOSETTING RESIN PORTION
James H. Flaherty, Hales Corners, Wis., assignor to General Motors Corporation, Detroit, Mich., a corporation of Delaware
Filed Nov. 19, 1962, Ser. No. 238,488
4 Claims. (Cl. 16—128)

This invention relates to construction and repair of articles of manufacture, and more particularly, to a versatile bonding application affording high strength and compatibility over long time periods.

An object of this invention is to provide a new and improved bonding procedure utilizing an electrical resistance heating wire energizable to effect final cure of an extruded covering of semi-cured though flexible or rigid thermosetting plastic means thereon with a minimum of labor even in areas difficult to reach with other fastening means as well as moisture and corrosion resistant.

Another object of this invention is to provide a combination tape-like electrical-resistance metal-reinforced heat-set adhesive means including an internal continuous heat-producing central-core element such as a metal wire and a cover portion of material such as thermosetting "B stage" epoxy, polyester, polyurethanes, polymerizable thermoplastics and the like directly outwardly thereon which is inexpensive to produce for fastening and sealing applications when an electrical current is supplied for internal heating to reinstitute a previously partially completed chemical polymerization reaction free of any epoxy mixing, "pot-life" and sticky handling problems normally associated with other than "B stage" epoxy material though a so-called "blocked" system can also be used with minute pinhead-sized molecular sieves to release catalyst driven out by heat and/or moisture.

Another object of this invention is to provide a procedure for fastening and/or sealing between parts of various materials such as metal panels of fender-body structures of vehicles as well as appliances including stoves and refrigerators, non-metallic vehicle and appliance components, industrial parts such as foundary cores and castings, masonry and conduit materials including stacked blocks, window and door frames as well as septic tank components, pipe and tiles by extruding a combination tape-like adhesive means having at least one reinforcing electrical wire coring and a variable cross-section thermosetting "B stage" epoxy plastic covering portion directly outwardly thereon, placing this combination tape-like wire and adhesive means in a predetermined position between parts to be joined, electrically energizing the wire coring for heat dissipation outwardly therefrom to reinstitute a previous partially completed chemical polymerization reaction and simultaneously finally curing the covering portion into a seal-bonding moisture and corrosion resistant relation between parts being joined.

A further object of this invention is to provide a thermosetting plastic and electrical curing system for joining articles of manufacture including a source of electrical power supplying electrical energization for a core of high electrical resistance wiring having good tensile qualities and having heat dissipation outwardly therefrom into a variable cross-section thermosetting "B stage" epoxy plastic covering portion carried directly outwardly on the wiring and subject to reinstitution of a previous partially completed chemical polymerization reaction and simultaneously finally curing the covering portion into a seal-bonding moisture and corrosion resistant relation between articles or parts being joined.

Another object of this invention is to provide a method of joining axially adjacent pieces of tubular means such as pipe and tile by preforming a combination tape-like adhesive means having a reinforcing electrical wire coring and thermosetting "B stage" epoxy plastic covering portion directly outwardly thereon into a closed loop configuration, telescoping the combination tape-like adhesive means axially between longitudinally adjacent pieces of tubular means, and finally electrically heat curing the covering portion into seal-bonding relation therewith.

Further objects and advantages of the present invention will be apparent from the following description, reference being had to the accompanying drawings wherein preferred embodiments of the present invention are clearly shown.

In the drawings:

FIGURE 1 illustrates a thermosetting plastic and electrical curing system following procedure of finally reinstituting a previous partially completed reaction for curing a combination tape-like wire and adhesive means in accordance with the present invention.

FIGURE 2 provides an enlarged fragmentary view of the combination tape-like wire and adhesive means.

Figure 8:
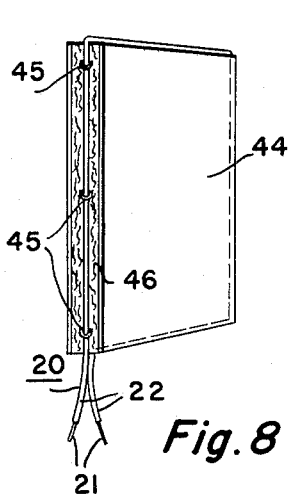
Figure 9:
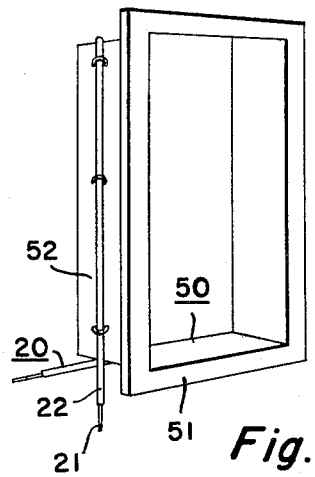
Figure 10:
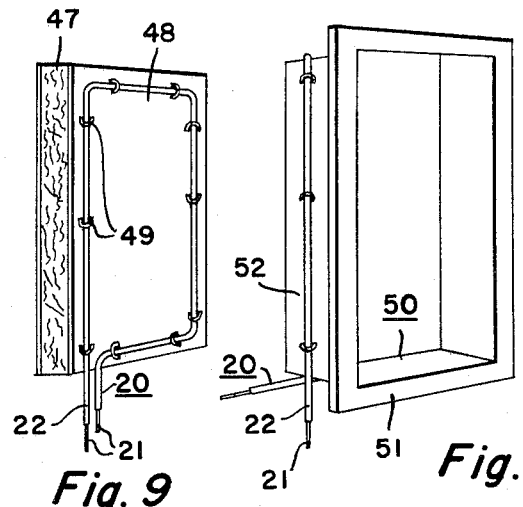

FIGURES 8, 9 and 10 provide perspective views as to panel butt joining, face mounting and window-door frame application of the combination tape-like wire-adhesive means for building construction.

Figure 11:
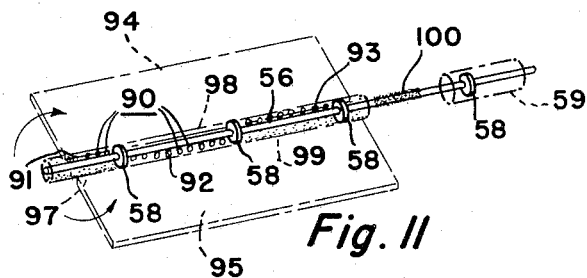

FIGURE 11 shows radial spacing means provided longitudinally at predetermined locations along wiring having a finally curable plastic covering portion in accordance with the present invention.

Figure 12:
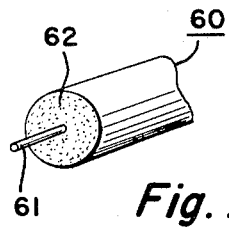

FIGURE 12 shows a foam-like compounded plastic used in the combination tape-like wire-adhesive means of the present invention.

Figure 13:
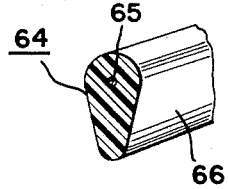
Figure 14:
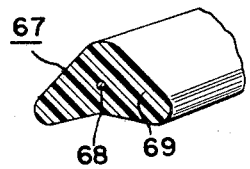
Figure 15:
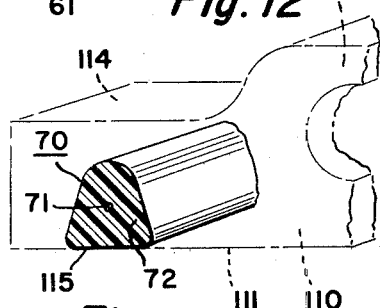

FIGURES 13, 14 and 15 show irregular triangular cross-sections of plastic adhesive covering over single electrical heating wire in combination tape-like wire-adhesive means in accordance with the present invention.

Figure 16:
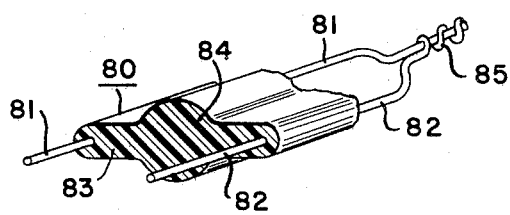

FIGURE 16 shows a multi-wire coring electrically energizable to finish cure extruded thermosetting plastic material therewith in another variation of configuration wherein a blind-ended closed loop of the coring can be provided further in accordance with the present invention.

Attempts have been made to adapt epoxy adhesive materials for various and sundry uses so far as construction and repair of articles of manufacture can be accomplished in a short period of time. However, there are many instances where such construction and repair can require considerable time and then so-called "A stage" or liquid epoxy materials are only of limited usefulness. For instance, some building contractors have considered use of epoxy "mortar" that can be squirted from a caulking gun but then such epoxy material must be in a flowable condition referred to as "A stage." Such mortar-type epoxy must be used within a short period after mixing thereof to avoid clogging up the caulking gun as the epoxy resin material sets. Also, with the "A stage" epoxy material there is a considerable cost for labor of mixing and handling. Furthermore, such "A stage" or liquid epoxy resin material can be difficult to supply or add in areas difficult to reach. Thus, the "A stage" or liquid epoxy material requiring mixing and quick handling can present problems even though use of fastening tools for placing and tightening fasteners could be eliminated thereby.

The present invention permits realization of a minimum cost of labor even in areas difficult to reach and avoids messy mixing and handling problems associated with so-called "A stage" or liquid epoxy materials having quite limited "pot-life" or usefulness in flowable condition due to relatively quick interaction of the epoxy resin and a suitable hardening agent once they are intermixed. Thus, a combination of a continuous heat-producing element such as a wire or conductor having a "B stage" thermosetting plastic resin material extruded thereon can be used in many different bonding applications accompanied by labor savings obtained by eliminating the mixing and handling problems. This "B stage" thermosetting plastic material can be a "B stage" epoxy in a semi-cured solid condition partially polymerized in a direction toward full curing and solidification. The extruded "B stage" thermosetting plastic material for "B stage" epoxy can be flexible and non-tacky though reinforced by the continuous heat-producing element such as the wire or conductor which permits placement of the combination structure even in areas difficult to reach by use of previous fasteners or liquid adhesive means. The combination structure of a continuous heat-producing element such as a wire or conductor with a "B stage" epoxy thereon is not sticky and does not have the "pot-life" problems normally associated with other than "B stage" epoxies.

Figure 1:
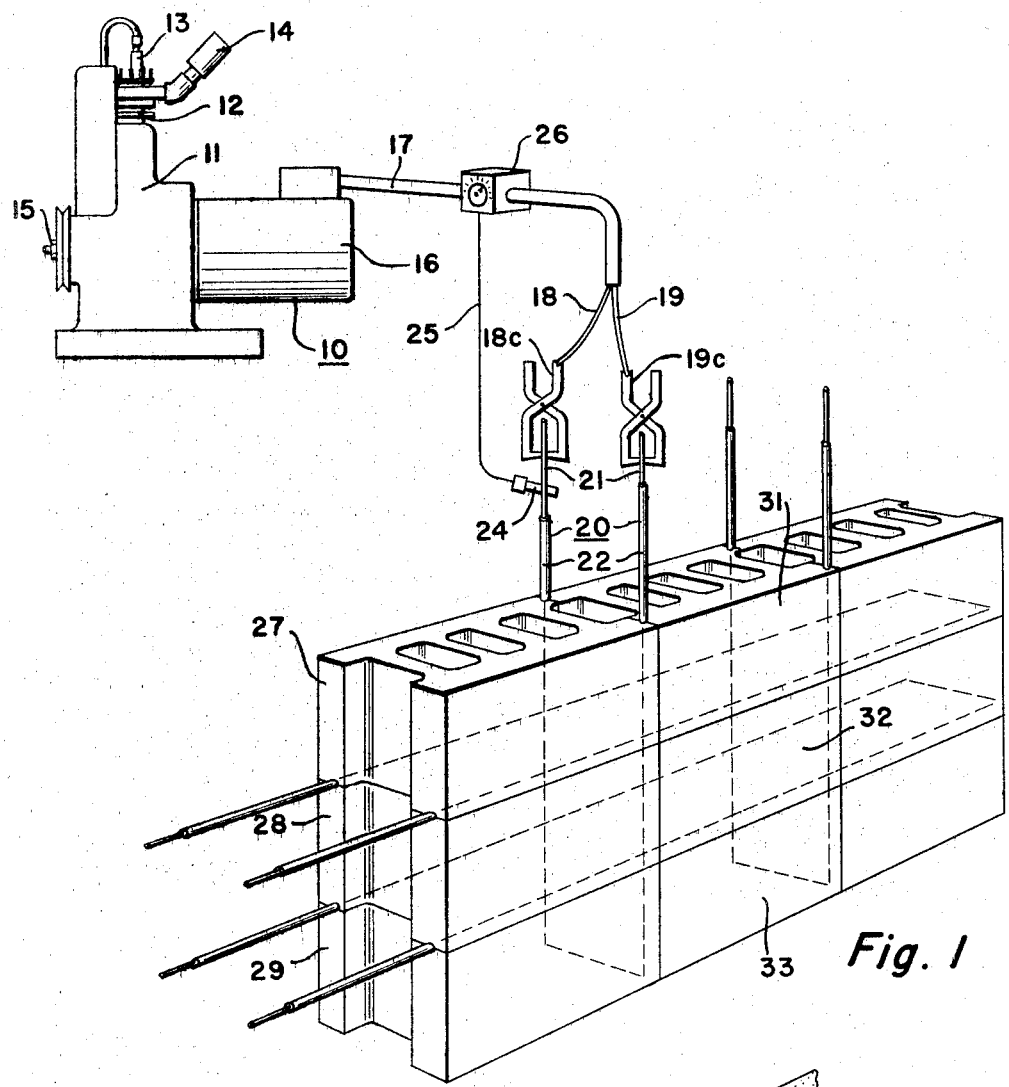

FIGURE 1 illustrates a thermosetting plastic and electrical curing system for use in accordance with the present invention. A source of electrical power generally indicated by numeral 10 is provided and can include, for example, a portable or movable internal combustion engine 11 having an air cooled cylinder 12 as well as a spark plug 13 and exhaust means 14 in a well-known manner. This internal combustion engine can be provided with a shaft 15 shared by a rotor (not shown) of an electric generator 16 having a stator field in which electric power is available in a well-known manner and is supplied to an output conductor means 17 having supply leads 18 and 19 insulated from each other though adapted to supply electrical energization by way of clamp-on devices 18c and 19c, respectively.

Figure 2:
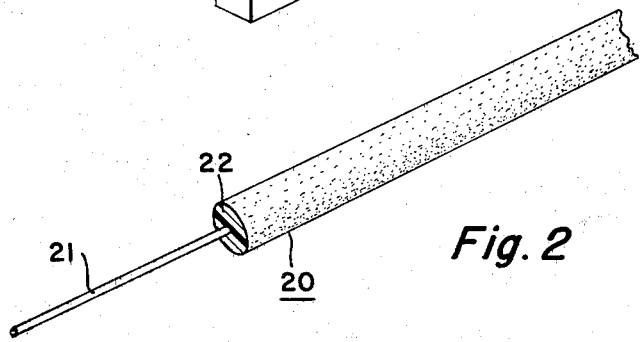

A combination structure generally indicated by numeral 20 in FIGURE 1 can include a continuous heat-producing element such as a wire or conductor 21 having bare opposite ends engaged by the clamping devices 18c and 19c and covered along an intermediate portion thereof by an extruded "B stage" thermosetting plastic resin or epoxy material indicated by reference numeral 22 in FIGURE 1. It is to be understood that supply of electrical energy to the heat-producing element such as an electrical resistance wire can be monitored or controlled by a suitable heat probe 24 having a line connection 25 to a temperature control device 26 such as an adjustable rheostat for limiting and controlling core-wire temperature by monitoring the input power for electrical energization and heat dissipation by the heat-producing element or resistant wire such as 21. The combination structure 20 including the heat-producing element such as the resistance wire or conductor 21 and the "B stage" thermosetting plastic material or epoxy resin 22 can be seen in an enlarged perspective and fragmentary view of FIGURE 2.

The combination structure 20 including the resistance wire 21 and "B stage" thermosetting plastic resin material 22 extruded thereon can be preformed or bent into a U-shape, for example, as outlined in FIGURE 1 such that the clamping devices 18c and 19c can be secured to accessible bare ends of the resistance wire 21 serving as built-in heating means energizable to effect final cure of the extruded covering 22 of semi-cured though flexible thermosetting plastic means. The resistance wiring 21 serves as a reinforcing coring to aid in physical placement of the semi-cured non-tacky and solid thermosetting plastic means which can be projected thereby even into difficult to reach areas without danger of misplacement and undesirable flowing away of previously known materials.

The illustration of FIGURE 1 shows building blocks such as indicated by numerals 27, 28 and 29 being joined at adjacent ends to building blocks 31, 32 and 33, respectively. These building blocks can be made of pressed or stamped cinders and/or concrete mixture in a well-known manner and the combination structure 20 including the resistance wiring 21 as a core for extruded "B stage" thermosetting or epoxy plastic resin can be supplied with continuous internal heating from the metal wiring 21 for inexpensively reinstituting and completing a previous partial curing and polymerization of the thermosetting plastic or epoxy "B stage" material.

Figure 3:
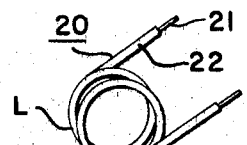
FIGURE 3 illustrates a closed-loop configuration of the combination tape-like wire-adhesive means to telescope between and join axially adjacent pieces of tubular means such as pipe and tile as shown in FIGURE 4.
Figure 4:
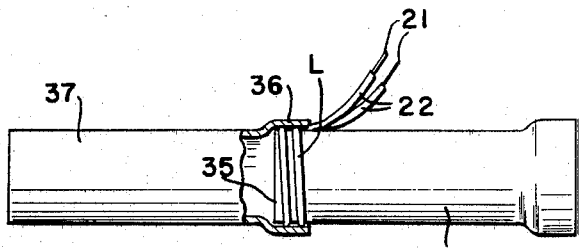

In FIGURE 3 there is shown a cylindrically spiralled or loop configuration L of the combination structure generally indicated by numeral 20 including the heating element of resistance wire 21 and "B stage" thermosetting plastic or epoxy resin material 22 therewith. This loop configuration can be formed to a predetermined diameter larger than outer diameter of an inner tile or pipe 34 having an annular end 35 which telescopes into an outwardly flared bell portion 36 of another tile or pipe 37 longitudinally and axially alignable relative to each other. The loop configuration L indicated in FIGURE 4 fits telescopically and longitudinally therebetween so as to have the bare or free ends of the resistance wire 21 project laterally therefrom for electrical energization and internal heating to reinstitute a previous partially completed chemical polymerization reaction free of any epoxy mixing, "pot-life," and sticky handling problems while proper positioning of the "B stage" epoxy material is maintained by the resistance wire coring radially between the end 35 and bell portion 36 of the mating tiles 34 and 37, respectively. Completion of curing of the "B stage" epoxy or thermosetting resin material results in a bonding seal between the telescoping ends of the tiles or pipes as illustrated in FIGURE 4. This bonding seal can be moisture as well as corrosion resistant for this and other bonding applications disclosed herewith.

The combination structure including the resistance wire core and "B stage" epoxy or thermosetting resin material 22 can also be used for joining sheet metal components of appliances such as stoves and refrigerators that can include a metal frame or structural member 38 to which a flat panel 39 is to be joined. Suitable contouring or embossing indicated by a reference E representing deformed metal integral with the panel 39 can be provided on such stoves and refrigerators and this embossing E can follow a predetermined pattern into which the combination structure 20 including the heating element of resistance wire 21 and "B stage" thermosetting resin or epoxy material 22 can be fitted subject to electrical energization of the resistance wiring for final curing of the thermosetting or "B stage" resin. Thus, there can be a hidden joining of panels on appliances such as stoves and refrigerators and excess resistance wire such as 21 can be trimmed or snipped off flush relative to the structural member 38 and an edge of the panel 39 upon completion of the bonding by supply of electrical energization to the resistance wire 21.

Figure 6:
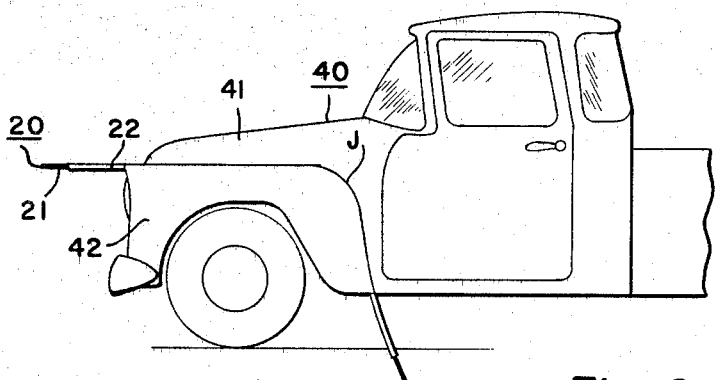
FIGURE 6 illustrates bonding of vehicle body components by use of the combination tape-like wire-adhesive means.

In addition to joining axially adjacent pieces of tubular means such as pipe and tile by preforming a combination tape-like adhesive means having reinforcing electrical wire coring and thermosetting "B stage" epoxy plastic covering portion directly outwardly thereon in a closed loop configuration, it is possible to form other irregular configurations such as for a motor vehicle generally indicated by numeral 40 in FIGURE 6 having a body 41 to which body components such as a fender 42 is to be joined. Previously, bolts have been used for holding on such body components and sometimes difficult welding operations were also utilized for joining body components to a vehicle body. A combination structure 20 of electrical resistance wiring 21 having an epoxy plastic covering portion 22 thereon can be placed along a juncture J of irregular configuration subject to supply of electrical energization to the resistance wiring 21 such that the radial outward heating from the wiring 21 can continue unattended as a vehicle moves down assembly lines or in a repair shop. It is to be understood that the vehicle bodies can be made of stamped sheet metal as well as various plastic or fiberglass compositions and that a wiring element such as 21 provided with a thermosetting "B stage" epoxy plastic covering portion directly outwardly thereon can be used successfully for joining any of such materials alone or in combination with each other.

Figure 7:
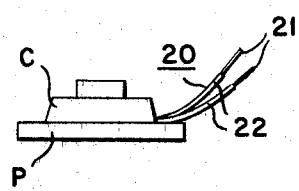
FIGURE 7 represents general industrial bonding of cores and other foundary usage of the combination tape-like wire-adhesive means.

FIGURE 7 represents use of the combination structure 20 including the resistance wire 21 as well as the epoxy plastic covering portion 22 for general purpose industrial bonding of castings and/or cores represented by a reference C in FIGURE 7 to a base plate P having the combination structure 20 therebetween.

Illustrations of FIGURES 8, 9 and 10 provide perspective views as to panel butt joining, face mounting and window-door frame application of the combination structure or tape-like wire-adhesive means generally indicated by numeral 20. In FIGURE 8 there is a fibrous panel 44 into which U-shaped staples 45 can be driven to hold the combination structure or tape-like wire-adhesive means 20 in place such that electrical energization can be supplied to bare ends of resistance wiring 21 having "B stage" thermosetting or epoxy plastic resin covering portion 22 directly outwardly thereon. The staples 45 are forced into edges such as 46 of the panel 44. Similarly, in FIGURE 9 there is a showing of a panel 47 having a side surface 48 around the peripheral edges of which suitable fasteners 49 can be added to hold the combination structure or tape-like wire-adhesive means 20 in place subject to electrical energization supplied to resistance wiring 21 having bare ends extending from within the plastic resin covering portion 22.

FIGURE 10 illustrates formation of another box-like loop around a door or window frame means 50 having an outwardly extending flange 51 as well as a laterally projecting mounting portion 52. Heating of the resistance wire 21 can effect reinstitution of final curing of the plastic covering portion 22 so as to effect a bond even between such a frame 50 of wood or metal to paneling such as 44 and 47 as well as to concrete blocks as represented by reference numerals 27–29 and 31–33 in FIGURE 1.

Figure 5:
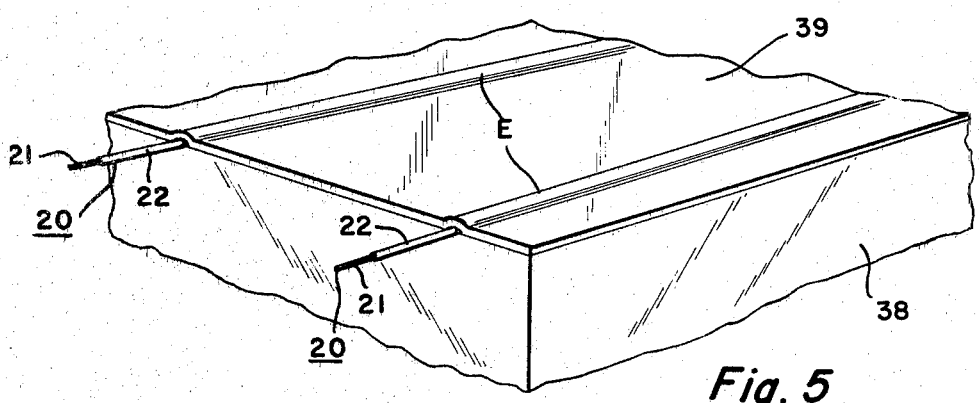
FIGURE 5 illustrates use of the combination tape-like wire-adhesive means for hidden joining of panels on appliances such as stoves and refrigerators.

Modifications of combination tape-like wire-adhesive means can be seen in FIGURES 11 through 16. For example, in FIGURE 11 there is a representation of a resistance wiring or heating element represented by numeral 56 as a core wire having annular bead-like members of suitable insulating material such as glass or of the same epoxy only completely cured represented by reference numeral 58 at predetermined intervals longitudinally thereof. These bead-like members 58 can insure filament-like centralization of the resistance wiring 56 within a plastic "B stage" thermosetting resin covering 59. The annular members 58 further assure against possible electrical shorting particularly when joining a metal panel such as 39 in FIGURE 5 to a structural member 38 on appliances and the like. Use of this arrangement as a hinge means is noted further on in this disclosure.

In FIGURE 12 there is shown a combination structure or wiring-adhesive means generally indicated by numeral 60 including a resistance wire or core portion 61 having a foam-like adhesive covering portion 62 directly outwardly thereon in a semi-cured, non-sticky and solid though curable condition. This foam-like plastic covering portion 62 is an expanded or expandable cellular plastic, either rigid or flexible, having excellent chemical resistance and dielectric properties though heat curable by electrical energization of the wiring core 61. The wiring core 61 provides localized heating and central reinforcement of the foam-like plastic covering portion 62. Foams with densities ranging from two through at least twenty pounds per cubic foot can be formed and semi-cured in place around the resistance wire core 61. Unicellular structure of epoxy foam in such moisture pickup is limited almost exclusively to exposed outer cells and thus storage of tape-like combination wire and plastic covering or adhesive means can occur without danger of excessive water absorption during storage.

FIGURE 13 illustrates a wedge-shaped configuration of a combination wiring and adhesive means generally indicated by numeral 64 including a wire resistance core 65 and the thermosetting or "B stage" epoxy plastic covering 66. This wedge-shaped or teardrop-like cross-section of the plastic covering portion 66 can be advantageous for certain irregular junctures or for mechanically anchoring the combination structure or wiring-adhesive means in a predetermined location subject to electrical energization of the wiring core 65 as described earlier. In FIGURE 14 there is shown a combination structure or wiring-adhesive means 67 including a central core of resistance wiring 68 as well as a substantially V-shaped curable though solid and non-sticky plastic covering portion 69. FIGURE 15 illustrates a keystone-shaped or isosceles triangle-like cross-section of a combination structure or wiring-adhesive means generally indicated by numeral 70 having a resistance wire core 71 and a plastic covering portion 72 therewith.

FIGURE 16 illustrates another combination structure or wiring-adhesive means generally indicated by numeral 80 with a multi-wire coring including electrical resistance heating elements or wiring 81 and 82 extending substantially parallel to each other as carried by a semi-cured non-tacky plastic resin or "B stage" epoxy covering portion 83 in a web-like cross-section centrally enlarged as shown at 84 into a substantially annular or cylindrical cross-section of the plastic thermosetting resin material which is caused to be cured laterally in between the electrical resistance wiring 81–82. Use of multi-wire coring such as the pair of conductors 81–82 is advantageous where the combination wiring-adhesive means in a longitudinal strip does not lend itself to formation of a closed loop, spiral, or U-shaped configuration but rather, is to be terminated after a straight line placement thereof. However, in place of forming a U-shaped configuration, for example, with a single-resistance wire coring, it is possible to join or twist the first and second resistant wiring portions 81 and 82 into a juncture 85 as indicated in FIGURE 16. Thus, electrical energization can be supplied to one end of each of the wiring cores 81 and 82 subject to completion of the circuit by a juncture 85 by joining or twisting of the opposite wire ends prior to insertion into a difficult to reach area.

Epoxy resin materials are plastic end polymers resulting from condensation-polymerization of starting monomers such as epichlorohydrin and diphenylolpropane and the like. Reference can be made to United States Patent 2,682,515–NAPS issued June 29, 1954 as to adhesive composition of epoxy materials. Epoxy resin materials are available commercially from various suppliers under differing trade names and numerical identification designations. A sample formulation of a flexible, non-tacky "B stage" semi-cured epoxy material can be used for the plastic resin covering portion provided directly outwardly on a resistance wire core or heating element by using a resin portion formula based on one hundred parts by weight of resin to include one hundred parts of epoxy resin material commercially available under a Jones-Dabney Co. trade name "Epi-rez 5132" as well as one hundred parts of thirty micron silica and one part of a colloidal silica commercially available under a trade name "Cab-O-Sil" available as prepared in a hot gaseous environment by a vapor phase hydrolysis of a silicon compound instead of by the usual aqueous precipitation process. This colloidal silica has high chemical purity, low water content as well as relatively large external surface area and can serve as a thixotropic agent for the resin mixture. Also as a convertor portion of this formula, there can be provided three parts of boron trifluoride-monoethylamine and three parts of acetone resulting in a mixture having a weight of substantially twelve and a half pounds per gallon and at least two months "pot-life" or final curing at room temperature. Mixing of the foregoing formula involves a blend of the "Epi-rez 5132" with silica and colloidal silica at about 170° F. Then the boron trifluoride-monoethylamine complex is dissolved in acetone and added to the warm resin mixture. The resin mixture can be cured to a tacky or semi-cured "B stage" condition by heating for a time interval of between two and one-half and three and one-half minutes at 350° F. Completion of the curing of so-called "B stage" epoxy resin can occur at 350° F. for forty-five minutes or at about 300° F. for about three hours. Properties of fully cured "B stage" epoxy resin include a flexural strength of 2500 p.s.i. and a tensile strength of 3800 p.s.i. As noted earlier, the "Epi-rez 5132" can be obtained commercially from Jones-Dabney Co. and the silica is available commercially as "Min-U-Sil" (30 micron) from Pennsylvania Pulverizing Co. The thixotropic agent such as "Cab-O-Sil" is commercially available from Cabot Corporation and the boron trifluoride-monoethylamine complex is commercially available from Harshaw Chemical Co. The above formulation is made solid and non-tacky while maintaining at least limited flexibility properties by addition of a solid resin such as "Epi-rez 520" such that a final mixture of the flexible, non-tacky, "B stage" epoxy thermosetting resin material can be taken to include ninety parts of "Epi-rez 5132," ten parts of "Epi-rez 520," two parts "Cab-O-Sil" as well as three parts of boron trifluoride-monoethylamine complex and three parts acetone. Reduction in tackiness can be accomplished by addition of more "Epi-rez 520" and likewise added thixotropy can be accomplished by addition of more "Cab-O-Sil." Such a formulation in effect has indefinite "pot-life."

There are many advantages for the present invention and features disclosed herein including the fact that a rapid and inexpensive procedure is provided which is simple and requires no mixing of materials on the job. As a result, errors in mixing can be avoided and the configuration of the combination structure or tape-like electrical-resistance metal-reinforced heat-set adhesive means is easily adaptable to various fabrication requirements. Use of large expensive ovens previously required for post curing can be avoided and specialized operators are no longer required. Large capital investment equipment is obviated and there is no "pot-life" problem and waste of material is kept to a minimum. Use of the metal or wiring core automatically provides a means for dispensing adhesive means evenly as reinforced therewith. The electrically energizable wiring provides an internal supporting filament contributing uniquely to the strength of the seal and bond made possible thereby. The subject combination structure or metal-reinforced adhesive means can be used under ambient temperature conditions while facilitating control of post cure temperatures as a result of electrical energization from a power source such as 10. Under such circumstances, consistent results for seal-bonding and material usage can be realized. Various metal parts as well as pre-cast concrete shapes can be joined with the thermosetting plastic covering portion being compounded to be pliable and non-tacky for storage purposes. The core of wire of high electrical resistance also possesses good tensile qualities while providing a medium for adequate heating for cure in a circuit which can be completed through the wire coring per se.

Materials such as "Epi-Rez 520" and the like are epichlorohydrin bisphenol A epoxy resins of increasing molecular weight and it is to be noted that a catalyst can be dicyandiamide and the like. "Epi-Rez 5132" can be used alone or in conjunction with other epoxy resin materials to produce flexible compositions having low water absorption and good electrical properties at elevated temperatures. Viscosity of "Epi-Rez 5132" is rather high (approximately 50,000 cps.) and generally this is mixed with other low viscosity resins or with low viscosity curing agents. Flexibility of material is generally obtained by adding approximately one-half of the mixture thereof as "Epi-Rez 5132" though upwards to 75% of this "Epi-Rez 5132" can be utilized for increased flexibility. Reference can be made to issue No. 1 of a booklet of Technical Data issued May 7, 1959 from the Resins and Chemicals Division of Jones-Dabney Co., division of Devoe & Raynolds Co., Inc. of Louisville, Kentucky and Los Angeles, California for further details concerning "Epi-Rez" materials.

It is generally to be noted that the bonding applications disclosed herewith do not require notches in the wire core for mechanical locking of epoxy resin or plastic resin material thereto. Furthermore, it is to be understood that the wire core may be coated with a high temperature dielectric such as a fluorine containing material, namely, polytetrafluorethylene (Teflon) and the like to act as a dielectric barrier to prevent shorting. The system in accordance with the present invention can make use of not only "B stage" epoxy material but also can be polyester, polyurethane or polymerizable thermoplastic materials as well as an optional so-called "blocked" system of which an indication is given in FIGURE 11. In such a "blocked" system the catalysts required to complete the reaction are not activated until they are driven out by heat or displaced by moisture as noted subsequently herein, thus differing from the "B" stage system wherein the cross-linking of polymer chains is discontinued by the removal of heat. The "blocked" system can include minute pinhead-sized molecular sieve-like means or capsule-like members generally indicated by numeral 90 in FIGURE 11. The sieve-like means or capsule-like members comprise such particles indicated by numerals 91, 92 and 93 in differing location on substantially opposite sides of the wire core or element 56 so as to permit adherence to differing structural components or members 94 and 95 made pivotable relative to each other due to adherence of sections 97, 98 and 99, respectively, to the opposite components 94–95 to be pivotable relative to axis therebetween which coincides with location of the wire core or element 56 independent of pivotal movement per se of the components or members 94–95. It is to be noted that the sections 97 and 99 are adhered by particles 91 and 93 to the member 94 whereas the section 98 is adhered by particles 92 to the member 95. An optional fluorine containing coated material indicated by numeral 100 can be added to the wire core 56 and can also extend between the bead-like members 58 so as to enhance pivotable movement between the components 94–95 with axis of pivotal movement being that of the wire core 56 as indicated by arrows in FIGURE 11. These sieve-like particles 91, 92 and 93 can serve to store catalysts which can be driven out through small pores or passages in the particles due to displacement by heat and/or moisture. Also it is to be noted that a filler material such as silver and the like could be added to enhance conduction and to supplement use of a wire core as noted.

The foam-like material of the covering portion 62 of FIGURE 12 can be expanded or expandable with application of heat. Also it is to be noted that the features of the present invention involving the finely curable material can be advantageous particularly in cold areas such as in Alaska and the like where low temperature could retard curing action and electrically curable plastic resin material can then be readily used in arctic or frigid climate conditions thereby avoiding further problems as to possible difficulty in curing which may result from inaccurate chemical proportioning. Also final inspection or quality testing of the improved combination wire and adhesive means is made possible by features in accordance with the present invention.

It is to be noted that bead-like members 58 can be made of the same epoxy material as used for the covering portion except that these bead-like members are previously completely cured or more cured so that when final curing occurs these beads become dams or barriers between sections of material which can be adhered at predetermined spots at opposite sides subject to use of the wire or core element as mold released during curing of the system to form a hinge pin as noted. Use of the particles such as 91, 92 and 93 is not absolutely necessary to form such hinge-like relationship between components such as panels since adherence can be controlled to opposite pivotable members or components while the epoxy is being cured and does not bond to the bead-like members which are also mold released to act as barriers or spacers therebetween.

With reference to FIGURE 15 it is noted there is shown a fragment of a resilient door seal generally indicated by numeral 110 which can have a surface 111 along an under side thereof and a hollow body portion 112 integral with a flange-like extension 114 in which an irregular shape of a body portion such as 70, for example, can be embedded leaving an under side 115 of the body portion 70 exposed to adhere directly to an appliance surface such as on a refrigerator door, stove housing and the like and provided with a resilient elastomeric seal requiring no metal fasteners. It is to be understood that the periphery of the body portion 72 other than along surface 115 can be prefused to interface with the flange 114, for example, and also that the fastening means 70 and sealing strip means 110 can be coextruded with the bondable wiring system in combination therewith.

The polymerizable thermoplastics can be monomer cast nylon material and the like and the so-called "blocked" system can require temperatures up to 215° F. so as to cause internal expansion of the catalyst which is driven out of the sieve-like peripheral surfacing of the capsule particles from which the catalyst escapes upon application of heat and/or moisture. It is also to be noted that the encapsulated catalyst system can be provided as a secondary or supplement to the wire curing arrangement by having exothermic reaction occur to cause considerable heating per se therefrom. This is to distinguish from endothermic situations in which heat is applied from external sources. Furthermore, electrical energization of the wire or conductor core or element can trigger the initial action for final curing and electric power can be saved by having such escape of a catalyst from such particles to expand the secondary reaction as a heat source. Use of borontrifluoride requires continuation of electrical energization for final curing.

While the embodiments of the present invention constitute preferred forms, it is to be understood that other forms might be adopted.

What is claimed is as follows:

1. In combination as a hinge means for structure including at least one member pivotable relative to another, a substantially centralized core element coated with a material so as to enhance pivotal movement ultimately to form a hinge pin, bead-like members located coaxially on said core element at predetermined intervals, and a thermosetting resin covering portion radially on said core element at least in part between bead-like members and alternately joined as cured to make one member pivotable relative to another with axis of pivotal movement coinciding with location of said substantially centralized core element.

2. The combination means of claim 1 wherein bead-like members are provided to separate said body portion at intervals so as to permit hinge-like movement thereof relative to said core element which is a wire-like pin therein coincident with axis of pivotal hinge-like movement.

3. The combination of claim 1 wherein said conducting means is a wire and said coated element has a fluorine-containing coating directly thereon to enhance possible pivotal movement of selective body portion location as well as conduction and also to act as a dielectric barrier against electrical shorting.

4. For use with a pair of members of which one is pivotable relative to another about predetermined axis therebetween, the combination therewith which comprises a wire-adhesive means including a cover-like body portion of initially partially polymerized thermosetting plastic resin material and selectively joined as fully polymerized to make one member pivotable relative to another, molecular sieve-capsule means carried by said plastic resin material in differing predetermined locations corresponding to adherence to join members pivotally and containing catalysts released for final polymerization of said plastic resin material more effectively in the predetermined locations, a core element with a fluorine-containing coating directly thereon to enhance possible pivotal movement and located as a hinge pin centrally of said thermosetting plastic resin material, said core element having axis thereof coinciding with axis of pivotal movement of the pair of members as to each other, and bead-like members located coaxially on said core element at predetermined intervals alternately with said plastic resin material upon full polymerization thereof enhanced by release of catalysts from said molecular sieve-capsule means to make one member pivotable relative to another.

References Cited by the Examiner

UNITED STATES PATENTS

| | | | |
|---|---|---|---|
| 1,960,120 | 5/1934 | Mohring | 264—27 |
| 2,243,506 | 5/1941 | Mitchell | 156—275 X |
| 2,845,516 | 7/1958 | Jones | 219—19 |
| 2,937,408 | 4/1960 | Limpel | 264—27 |
| 3,047,703 | 7/1962 | Aske | 156—275 |
| 3,049,465 | 8/1962 | Wilkins | 156—275 |
| 3,062,940 | 11/1962 | Bauer et al. | 219—19 |
| 3,094,452 | 6/1963 | Von Riegen et al. | 156—275 |

FOREIGN PATENTS 336,980   3/1959   Switzerland.

OTHER REFERENCES

Lee and Neville: Epoxy Resins, McGraw-Hill, New York, 1957, pages 52 and 53.

EARL M. BERGERT, *Primary Examiner.*

RICHARD M. WOOD, *Examiner.*

V. Y. MAYEWSKY, D. J. DRUMMOND,
*Assistant Examiners.*